United States Patent [19]

Beccaria et al.

[11] 4,246,921
[45] Jan. 27, 1981

[54] FLUID-PRESSURE OPERATED PILOT VALVE DEVICES

[75] Inventors: Mario Beccaria, Rivalta; Renzo Moretti, Cambiano, both of Italy

[73] Assignee: Fiat Societa per Azioni, Turin, Italy

[21] Appl. No.: 970,027

[22] Filed: Dec. 15, 1978

[30] Foreign Application Priority Data

Dec. 22, 1977 [IT] Italy .............................. 69880 A/77

[51] Int. Cl.³ ........................................ F16K 31/365
[52] U.S. Cl. ............................. 137/102; 137/624.14; 137/624.15
[58] Field of Search ............. 137/624.14, 624.18, 137/102; 91/318; 251/53

[56] References Cited

U.S. PATENT DOCUMENTS

| | | | |
|---|---|---|---|
| 3,326,237 | 6/1967 | Frick | 137/102 X |
| 3,380,348 | 4/1968 | Kroffke | 137/624.14 X |
| 3,720,232 | 3/1973 | Corliss | 137/624.14 |
| 4,114,515 | 9/1978 | Pauliukonis | 91/318 X |

*Primary Examiner*—Alan Cohan
*Attorney, Agent, or Firm*—Sughrue, Rothwell, Mion, Zinn & Macpeak

[57] ABSTRACT

A fluid-pressure operated pilot valve produces a cyclic modulation of pressure in a control duct, for operating a relay valve, by introducing a predetermined delay between the displacement of a first valve element from, and its return to, a first position against a first valve seat by a fluid-pressure operated timer device, which includes flow restrictor means and a pressure accumulator, acting upon the larger area side of a differential area actuator which vents the pressure in the control duct to an exhaust duct in a second position of the first valve element; the relay valve being operable in response to the cyclic pressure changes in the control duct to admit an irrigating liquid to an irrigation spray nozzle.

7 Claims, 1 Drawing Figure

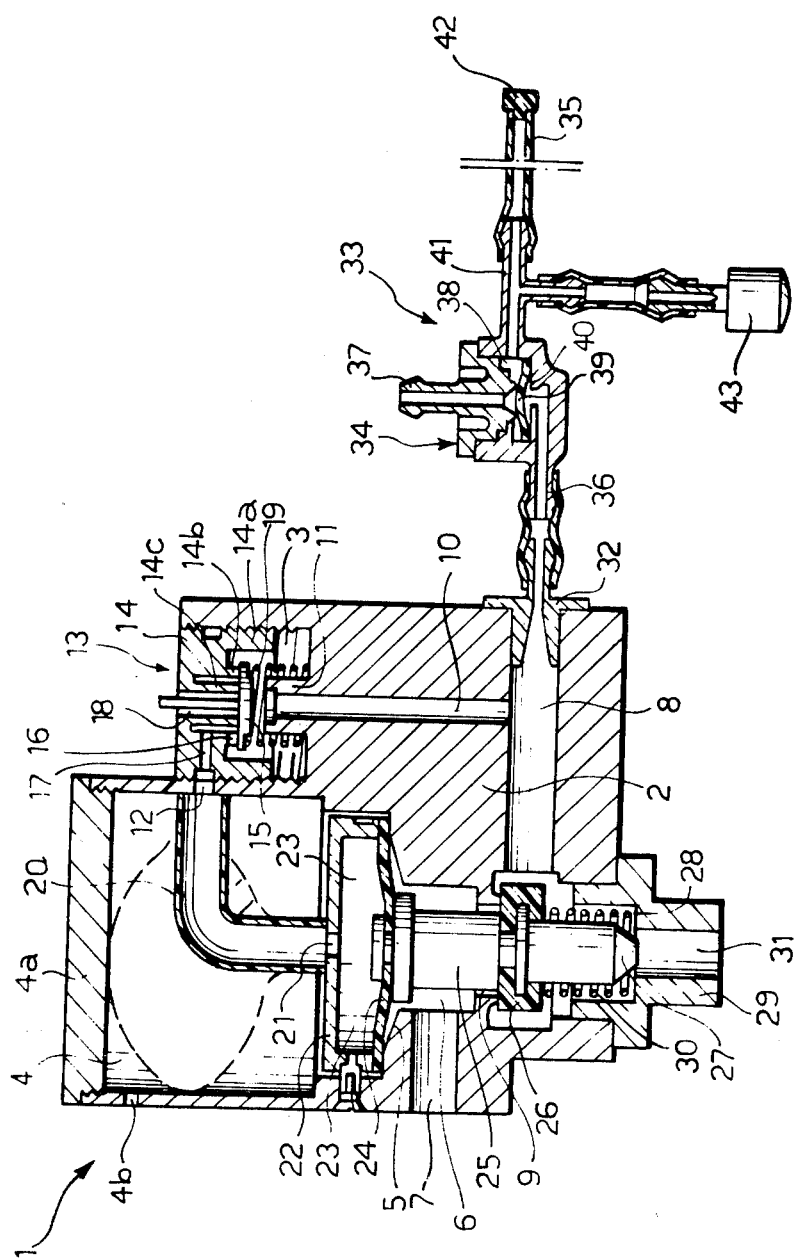

FLUID-PRESSURE OPERATED PILOT VALVE DEVICES

The present invention relates to fluid-pressure operated pilot valve devices.

In particular, but not exclusively, the invention is concerned with pilot valve devices which are suitable for installation in irrigation systems for the purpose of initiating an irrigation cycle automatically at predetermined intervals by connecting an irrigation liquid supply to irrigation liquid delivery means.

In irrigation systems which incorporate known hydraulic pilot valve devices as, for example, in U.S. Pat. No. 4,176,791, granted Dec. 4, 1979, it is necessary for the liquid delivery means to form a closed circuit, being connected at both of its ends to the same pilot valve unit. With systems of this type it is not always possible to have a linear arrangement of delivery pipes since each unit must work independently. This disadvantage is particularly apparent when the system is used in areas of large scale cultivation where a closed circuit of pipes is not always compatible with the use of agricultural machinery, particularly where the pipes have to cross rows of crops.

The object of the present invention is to provide a fluid pressure operated pilot valve device for providing a cyclical modulation of a fluid pressure in a control pressure duct which is particularly suitable for use in irrigation systems having a linear arrangement of delivery pipes.

According to the present invention there is provided a fluid-pressure operated pilot valve device for producing a cyclical modulation of fluid pressure in a control duct, to operate a relay valve, comprising a first valve element which is displaced from a first position to a second position by fluid pressure at an inlet to switch the control pressure duct from one fluid pressure level to another, and means for returning the valve element to its first position under control of a fluid pressure-operated timer device, supplied with fluid under pressure from the control pressure duct, which introduces a predetermined delay between the displacement of the valve element and its return to the first position.

In a preferred embodiment the pilot valve device further comprises a differential area actuator resiliently biassed into the first position in which it normally maintains the first valve element against a first valve seat, sealing an exhaust duct from the control pressure duct, which is normally in communication with the fluid pressure inlet through a second valve seat, of smaller effective area than the first valve seat, co-operating with a second valve element displaceable by the actuator, and a passage connecting the control pressure duct to a larger area side of the actuator through flow restrictor means and a pressure accumulator constituting the said timer device, so that when a fluid pressure is applied to the inlet the actuator is displaced, after the predetermined time delay, to move the first valve element from the first valve seat, venting the control pressure duct to the exhaust duct, and to move the second valve element onto the second seat, reducing the effective area of the actuator subjected to the said fluid pressure, the actuator being maintained in this second position until the pressure in the accumulator drops sufficiently to allow the first valve element to return to the first position and the second valve element to move away from the second seat, when the pressure in the control pressure duct reverts to the fluid inlet pressure.

The pressure accumulator may comprise a chamber having at least one resiliently loaded wall. In the preferred embodiment the chamber is defined by a tubular elastic membrane.

One embodiment of the invention will now be more particularly described, by way of example, with reference to the accompanying, purely diagrammatic drawing which is a longitudinal section of a hydraulic-pressure operated pilot valve device according to the invention connected to a liquid delivery means of a irrigation system.

A hydraulic pilot valve device, generally indicated 1, comprises a valve body 2, in one end face of which are made a first, screw-threaded cavity 3 and a second, larger, cavity 4 which is partially screw-threaded to receive a cover-plate 4a. The second cavity 4 narrows at an annular shoulder 5 into a smaller diameter, cylindrical through-bore 6 which opens into the opposite end face of the valve body 2. First and second ducts 7, 8 branch perpendicularly from the through-bore 6 in opposite directions to open into opposite side faces of the valve body 2. The ducts 7, 8 are spaced axially from each other along the through-bore 6, the first duct 7 being closer to the annular shoulder 5. The through-bore 6 is formed with a first annular valve seat 9 between the ducts 7, 8. A passage 10 branches perpendicularly from the second duct 8 and communicates with the first cavity 3, opening into the latter through a neck 11. The first cavity 3 is connected with the second cavity 4 through a passage-port 12.

A metering device 13 is located in the first cavity 3 and comprises a flanged cap 14 and a freely movable valve poppet 15. The cap 14 has an outer, annular, screw-threaded flange 14a which screws into the first cavity 3 and an intermediate, annular flange 14b having a small notch which, cooperating with the valve poppet 15 forms a port 16 connecting the cavity 3 with a narrow, transverse bore 17 in the cap 14. An inner, annular flange 14c of the cap 14 defines an interior end of a vent passage 18 extending axially through the cap 14.

The port 16, the transverse bore 17 and the passage-port 12 comprise flow restrictor means between the first cavity 3 and the second cavity 4.

The valve poppet 15 is biassed into a first, rest, position closing the vent passage 18 (as shown) by a helical spring 19 which surrounds the neck 11, in this position the inner flange 14c forms an annular stop for the valve poppet 15. In the rest position the passage 10 communicates with the second cavity 4 through the flow restrictor means 12, 16, 17. In a second position (not shown) the valve poppet 15 seats against the neck 11, closing the passage 10 and connecting the second cavity 4 with the vent passage 18 through the passage-port 12 and the transverse bore 17.

Housed within the second cavity 4 is a pressure accumulator formed by an expansible, tubular, elastic membrane 20 which is connected at one of its ends to the passage-port 12 of the flow restrictor means and, at its other end, to a central hole 21 in a wall 22 of a small chamber 23 also housed within the cavity 4. The opposite wall of the chamber 23 is formed by a deformable, elastomeric diaphragm 24 clamped peripherally against the annular shoulder 5 of the cavity 4.

The diaphragm 24 forms a large area member of a differential area actuator also comprising a plunger 25 attached centrally to the diaphragm 24 and extending coaxially within the through-bore 6, a first valve element, formed by an elastomeric shutter 26, carried by the plunger 25 and cooperating with the first valve seat 9, and a second valve element, formed by a frusto-conical end 27 of the plunger 25, which also forms the small area member of the differential area actuator. The frusto-conical end 27 cooperates with a second valve seat which is formed by an interior annular shoulder 28 of a centrally apertured plug 29 inserted into the open end of the through-bore 6 opposite the diaphragm 24. The annular shoulder 28 supports a helical spring 30 which resiliently biasses the first valve element, the shutter 26, into a first position (as shown).

In the first position the shutter 26 seals against the first valve seat 9 and prevents communication between the first duct 7 and the second duct 8. In a second position (not shown) the shutter 26 is moved away from the first valve seat 9 and the frusto-conical end 27 engages the second valve seat, the annular shoulder 28, closing an aperture 31 in the plug 29 and thereby connecting the first duct 7 with the second duct 8.

The pilot valve 1, when installed in a spray irrigation system, is connected, at an outlet 32 of the second duct 8, to irrigation liquid delivery means 33, one of which is shown, comprising a spray valve 34 and a resilient reservoir 43.

The relay valve 34 has a supply inlet 36 connected to the outlet 32 of the pilot valve 1 and a spray nozzle 37 adapted to be periodically connected to a supply of the irrigating liquid. The inlet 36 and nozzle 37 open into a central chamber 38 of the valve 34 in which is located a flexible valve member resting on an annular shoulder 40. The valve member 39 is deformable between a first position (as shown), in which the central part of the diaphragm 39 closes the spray nozzle 37 while the edge of the diaphragm may flex from the shoulder 40, and a second position (not shown), in which the spray nozzle 37 is in communication with the reservoir 43 38. The valve chamber 38 communicates permanently with a pipe 41 which is connected to one end of the conduit 35 which may lead to other spray devices or which may be closed by a plug 42.

A resilient reservoir or accumulator 43 is connected to the pipe 41.

In use of the pilot valve 1 the first duct 7 is connected to an exhaust or drain outlet, the second duct 8 is a control pressure duct, and the aperture 31 of the plug 29 is connected to a supply of the irrigating liquid, usually water from a mains supply.

The water supplied to the inlet aperture 31 under mains pressure flows through the control pressure duct 8, some water passing through the outlet 32 and valve control inlet 36 into the central chamber 38 of the valve 34 where the diaphragm 39 deforms into the first position (as shown) closing the spray nozzle 37 and allowing water to be supplied to reservoir 43 and additional spray devices through conduit 35. The water supplied under mains pressure to the control pressure duct 8 also passes through the passage 10 into the first chamber 3 and, through the tubular membrane 20, into the small chamber 23.

The flow restrictor means, comprising the port 16, the bore 17 and the passage-port 12, predetermine the rate of pressure increase in the tubular membrane 20 and the small chamber 23. The water in the membrane 20 and the chamber 23 are initially at less than mains pressure due to the restricted flow but, as the pressure approaches that of the mains the membrane 20 dilates within the confines of the second cavity 4, as shown in broken outline in the drawing, until further expansion is prevented by the walls of the cavity 4 and the cover-plate 4a, the air in the cavity 4 being expelled through a vent 4b. At this point the pressure within the tubular membrane 20 and the small chamber 23 approaches the mains pressure, but because the effective area of the diaphragm 24 is greater than the effective area of the shutter 26, which is acted upon by the mains pressure, the diaphragm 24 is deformed downwardly, as shown in the drawing, overcoming the spring 30 and moving the shutter 26 into its second position which connects the control pressure duct 8 with the exhaust duct 7 and closes the inlet aperture 31 by engaging the frusto-conical end 27 of the plunger with the annular shoulder 28.

Upon opening of the exhaust duct 7 the water pressure in the control duct 8, the passage 10 and the relay valve control inlet 36 is vented to the exhaust duct 7. This discharge occurs rapidly so that the small chamber 23 and the tubular membrane 20 will then be at a relatively higher pressure due to the restricted flow passages 12, 16, 17. This results in a displacement of the valve poppet 15, against the action of the spring 19, into its second position blocking the passage 10 and opening the vent passage 18, through which the water pressure is discharged. The accumulator, the membrane 20, slowly contracts while the diaphragm 24, with its large effective area relative to the area of the frusto-conical end 27 of the plunger 25, maintains the said end of the plunger in sealing engagement with the annular shoulder 28 for a predetermined interval. During this interval, the pressure drop in the control inlet 36 of the relay valve 34 causes the valve member 39 to be deformed into its second position allowing water from the resilient reservoir 43 to flow into the spray nozzle 37 for discharge.

After an interval, predetermined by the flow restriction means 12 and 17, the effect of the differential area of the diaphragm 24 relative to that of the plunger end 27 is overcome, and the spring 30 returns the shutter 26 to its first position. The above described cycle of operations then repeats itself automatically resulting in a cyclic modulation of the pressure in the control pressure duct 8.

The repetition time for each pressure-modulation cycle may be varied by altering the size of the second cavity 4, the size of the flow restricting passages 12, 16, 17, the strength of the springs 19, 30 and the resilience of the diaphragms 24, 39, or the thickness of the accumulator membrane 20. A convenient and simple means of such variation would be a number of cover-plates 4a of differing thicknesses to alter the size of the second cavity 4 and, hence, the degree of permitted expansion of the membrane 20.

What is claimed is:

1. A fluid pressure operated pilot valve device for producing a cyclic modulation of fluid pressure to operate a relay valve, said pilot valve device comprising, in combination: - means defining a control pressure duct, in which said modulation of pressure is produced;
   fluid pressure inlet means;
   exhaust duct valve means, movable between a first position wherein said inlet means is connected to said control duct and a second position wherein said exhaust duct means is connected to said control duct;
   actuator means for displacing said valve means from said first position to said second position;

a fluid pressure operated timer means comprised of a tubular elastic membrane operatively connecting said actuator means with said control duct to introduce a predetermined delay prior to said displacement of said valve means from said first position to said second position, said timer means providing an additional predetermined delay after said displacement of said valve means to said second position and means for returning said valve means to said first position at the end of said additional delay.

2. A fluid pressure operated pilot valve device as defined in claim 1, wherein said actuator means comprises:

a differential area actuator;

resilient means biasing said actuator into said first position;

said valve means comprising a first valve element, a first valve seat against which said first valve element is sealed in said first position;

said exhaust duct being sealed from said control pressure duct in said first position of said first valve element when said control pressure duct is in communication with said fluid pressure inlet means;

a second valve seat through which said control pressure duct is in communication with said fluid pressure inlet means;

a second valve element displaceable by said actuator into cooperation with said second valve seat in a second position of said actuator;

flow restrictor means;

a pressure accumulator; and said timer means comprising passage means connecting said control pressure duct with the larger area side of said actuator through said flow restrictor means and said pressure accumulator, whereby: when a fluid pressure is applied to said inlet means said actuator is displaced, after the said predetermined time delay, to move said first valve element from said first valve seat, venting said control pressure duct to said exhaust duct means, and to move said second valve element onto said second seat, reducing the effective area of said actuator subjected to the said fluid pressure, said actuator being maintained in this said second position until the pressure in said accumulator drops sufficiently to allow said first valve element to return to said first position and said second valve element to move away from said second seat, when the pressure in said control pressure duct reverts to the pressure at said inlet means.

3. A pilot valve device as defined in claim 2 wherein said differential area actuator includes a flexible diaphragm one face of which constitutes said larger area side of said actuator.

4. A pilot valve device as defined in claim 2 or claim 3 wherein said differential area actuator also includes:

a plunger terminating at the smaller area end of the actuator in said second valve element, a resilient elastomeric shutter carried by said plunger and constituting said first valve element.

5. A pilot valve device as defined in claim 2 or claim 3, wherein said second valve seat supports one end of a spring which constitutes said resilient biassing means of said actuator.

6. A pilot valve device as defined in claim 2 wherein said flow restrictor means include:

means defining a cavity, a restricted flow passage means between said cavity means and said accumulator;

a flow restricting vent passage means; and a resilient loaded valve, located in said cavity means between said control pressure duct means and said pressure accumulator and having a first position in which it defines said restricted flow passage means, said valve being so arranged that when the pressure in said control duct is vented to said exhaust duct means said valve moves to a second position, cutting off said passage means from said control duct and venting said accumulator to said flow restricting vent passage means.

7. A pilot valve device as defined in claim 1 or claim 2, in combination with an irrigation pipe system and a said relay valve which is connected to the control pressure duct and is operable in response to changes in the control pressure between said two levels to admit irrigating liquid to said irrigation pipe system.

* * * * *